(12) United States Patent
Hester et al.

(10) Patent No.: US 7,279,215 B2
(45) Date of Patent: Oct. 9, 2007

(54) MEMBRANE MODULES AND INTEGRATED MEMBRANE CASSETTES

(75) Inventors: Jonathan F. Hester, Hudson, WI (US); David J. Colburn, South St. Paul, MN (US); Michael K. Domroese, Woodbury, MN (US); Harold T. Freemyer, Woodbury, MN (US); Robert S. Kody, Minneapolis, MN (US); David F. Slama, Grant, MN (US); Peter B. Zenk, Mpls., MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/726,900

(22) Filed: Dec. 3, 2003

(65) Prior Publication Data

US 2005/0123727 A1 Jun. 9, 2005

(51) Int. Cl.
- *B32B 1/00* (2006.01)
- *B01D 63/00* (2006.01)
- *B01D 39/00* (2006.01)
- *C02F 1/44* (2006.01)

(52) U.S. Cl. .................. 428/178; 428/188; 210/321.64; 210/321.75; 210/486; 55/495

(58) Field of Classification Search .............. 428/178, 428/188, 14, 137; 210/321.64, 321.75, 321.72, 210/314, 486, 488; 55/495
See application file for complete search history.

(56) References Cited

U.S. PATENT DOCUMENTS

| | | | |
|---|---|---|---|
| 3,472,765 A | 10/1969 | Budd et al. | |
| 3,679,059 A | 7/1972 | Wyatt et al. | |
| 3,708,071 A | 1/1973 | Crowley | |
| 3,847,657 A | 11/1974 | Rieber et al. | |
| 4,002,567 A | 1/1977 | Konno et al. | |
| 4,053,418 A | 10/1977 | Newman | |
| 4,181,604 A | 1/1980 | Onishi et al. | |
| 4,264,447 A | 4/1981 | Nicolet | |
| 4,302,270 A | 11/1981 | Nicolet | |
| 4,333,779 A | 6/1982 | Rinker et al. | |
| 4,416,993 A | 11/1983 | McKeown | |
| 4,440,641 A | 4/1984 | Ostertag | |
| 4,539,256 A | 9/1985 | Shipman | |
| 4,701,234 A | 10/1987 | Rogemont et al. | |
| 4,746,435 A | 5/1988 | Onishi et al. | |

(Continued)

FOREIGN PATENT DOCUMENTS

EP    0 197 024    10/1986

(Continued)

OTHER PUBLICATIONS

U.S. Appl. No. 10/438,090, filed May 14, 2003, Hester et al.

(Continued)

*Primary Examiner*—Donald J. Loney
(74) *Attorney, Agent, or Firm*—Sean J. Edman

(57) ABSTRACT

The invention features integrated membrane assemblies for selectively transferring a constituent to or from a fluid. The assemblies include two or more flat sheet membrane elements and at least one common manifold connected to the interior regions of the membrane elements.

16 Claims, 12 Drawing Sheets

U.S. PATENT DOCUMENTS

| | | | |
|---|---|---|---|
| 4,789,468 A * | 12/1988 | Sirkar | 210/137 |
| 4,869,821 A | 9/1989 | Korin | |
| 4,871,456 A | 10/1989 | Naruo et al. | |
| 4,886,601 A | 12/1989 | Iwatsuka et al. | |
| 5,069,403 A | 12/1991 | Marentic et al. | |
| 5,071,553 A | 12/1991 | Newlin | |
| 5,104,532 A * | 4/1992 | Thompson et al. | 210/224 |
| 5,116,506 A | 5/1992 | Williamson et al. | |
| 5,156,780 A | 10/1992 | Kenigsberg et al. | |
| 5,192,456 A | 3/1993 | Ishida et al. | |
| 5,248,424 A | 9/1993 | Cote et al. | |
| 5,260,360 A | 11/1993 | Mrozinski et al. | |
| 5,286,279 A | 2/1994 | Wu | |
| 5,352,513 A | 10/1994 | Mrozinski et al. | |
| 5,437,651 A | 8/1995 | Todd et al. | |
| 5,445,771 A | 8/1995 | Degen | |
| 5,480,553 A | 1/1996 | Yamamori et al. | |
| 5,482,625 A | 1/1996 | Shimizu et al. | |
| 5,514,120 A | 5/1996 | Johnston et al. | |
| 5,626,751 A | 5/1997 | Kikuchi et al. | |
| 5,639,373 A | 6/1997 | Mahendran et al. | |
| 5,651,888 A | 7/1997 | Shimizu et al. | |
| 5,651,889 A | 7/1997 | Wataya et al. | |
| 5,670,573 A | 9/1997 | Kirchner et al. | |
| 5,690,949 A | 11/1997 | Weimer et al. | |
| 5,738,111 A | 4/1998 | Weimer et al. | |
| 5,783,083 A | 7/1998 | Henshaw et al. | |
| 5,787,702 A | 8/1998 | Tiedtke et al. | |
| 5,868,930 A * | 2/1999 | Kopf | 210/321.75 |
| 5,876,604 A | 3/1999 | Nemser et al. | |
| 5,914,039 A | 6/1999 | Mahendran et al. | |
| 5,922,201 A | 7/1999 | Yamamori et al. | |
| 5,989,698 A | 11/1999 | Mrozinski et al. | |
| 6,068,771 A | 5/2000 | McDermott et al. | |
| 6,193,890 B1 | 2/2001 | Pedersen et al. | |
| 6,287,467 B1 | 9/2001 | Nagano et al. | |
| 6,290,685 B1 | 9/2001 | Insley et al. | |
| 6,294,039 B1 | 9/2001 | Mahendran et al. | |
| 6,325,928 B1 | 12/2001 | Pedersen et al. | |
| 6,505,744 B1 | 1/2003 | Geaugey et al. | |
| 6,514,412 B1 | 2/2003 | Insley et al. | |
| 6,558,549 B2 | 5/2003 | Cote et al. | |
| 6,589,317 B2 | 7/2003 | Zhang et al. | |
| 2002/0011443 A1 | 1/2002 | Komatsu et al. | |
| 2002/0195390 A1 | 12/2002 | Zha et al. | |
| 2003/0010690 A1 | 1/2003 | Okajima et al. | |
| 2003/0104192 A1 | 6/2003 | Hester et al. | |
| 2003/0203183 A1 | 10/2003 | Hester et al. | |
| 2003/0228459 A1 | 12/2003 | Mrozinski et al. | |

FOREIGN PATENT DOCUMENTS

| | | |
|---|---|---|
| EP | 0 443 642 | 8/1991 |
| EP | 0 510 328 | 10/1992 |
| EP | 0 526 823 | 2/1993 |
| EP | 0 602 560 | 6/1994 |
| EP | 0 653 240 | 5/1995 |
| EP | 0 662 341 | 7/1995 |
| EP | 1 127 849 | 10/1999 |
| EP | 1 166 859 | 1/2002 |
| JP | 62-155906 | 7/1987 |
| JP | 1-155906 | 6/1989 |
| JP | 1-155907 | 6/1989 |
| JP | 07016591 | 1/1995 |
| JP | 9-120246 | 5/1997 |
| JP | 11244672 | 9/1999 |
| WO | WO97/44508 | 11/1997 |
| WO | WO98/01219 | 1/1998 |
| WO | WO99/65542 | 12/1999 |
| WO | WO99/65595 | 12/1999 |
| WO | WO99/65664 | 12/1999 |
| WO | WO 03/037489 | 5/2003 |

OTHER PUBLICATIONS

Keith Brindle, Tom Stephenson, Michael J. Semmens, "Pilot-Plant Treatment of a High-Strength Brewery Wastewater Using a Membrane-Aeration Bioreactor," Water Environment Research, vol. 71, No. 6, pp. 1197-1204 (Sep./Oct. 1999).

John T. Cookson, Jr., Bioremediation Engineering: Design and Application, McGraw-Hill, Inc., 1995, Chapter 8, pp. 305-358, and Chapter 9, pp. 359-432.

Y. Suzuki et al., "Oxygen Supply Method Using Gas Permeable Film for Wastewater Treatment," Wat.SciTech., vol. 28, No. 7, pp. 243-250, 1993.

M. Pankhania et al., Hollow Fibre Bioreactor for Wastewater Treatment Using Bubbleless Membrane Aeration, Wat.Res., vol. 28, No. 10, pp. 2233-2236, 1994.

Pierre Cote et al., "Bubble-Free Aeration Using Membranes: Process Analysis," Journal WPCF, vol. 60, No. 11, pp. 1986-1992, Nov. 1988.

Pierre Cote, "Bubble-Free Aeration Using Membranes: Mass Transfer Analysis," Journal of Membrane Science, 47 (1989) 91-106.

Keith Brindle et al., "The Application of Membrane Biological Reactors for the Treatment of Wastewaters," Biotechnology and Bioengineering, vol. 49, pp. 601-610 (1996).

E. Casey et al., "Review of Membrane Aerated Biofilm Reactors," Resources, Conservation and Recycling 27 (1999) 203-215.

D'Agustino et al., "Chemical Mechanisms in $C_3F_8$-$H_2$ Radiofrequency Discharges", Plasma Chemistry and Plasma Processing, 4, 21-30, 1984.

Ito et al., "pH-Sensitive Gating by Conformational Change of a Polypeptide Brush Grafted onto a Porous Polymer Membrane", Journal Am.Chem. Soc., 119, 1619-1623 (1997).

Akhtar et al., "Coatings reduce the fouling of microfiltration membranes", J.Membr.Sci., 107, 209-218 (1995).

Iwata et al., "Preparation of Anti-Oil Stained Membrane by Grafting Polyethylene Glycol Macromer onto Polysulfone Membrane", J.Appl.Polym.Sci., 54, 125-128 (1994).

Iwata et at., "Preparation and Properties of Novel Environment-Sensitive Membranes Prepared by Graft Polymerization onto a Porous Membrane", J.Membr.Sci., 38, 185-199 (1988).

Thom et al., "Photochemical Grafting of Poly(Ethylene Glycol)s Yielding Low-Protein-Adsorbing UF Membranes", Acta Polytech. Scand., Chem. Technol.Metall.Ser., 247, 35-50 (1997).

Ulbricht et al., "Photo-induced graft polymerization surface modifications for the preparation of hydrophilic and low-protein-adsorbing ultrafiltration membranes", J.Membr.Sci., 115, 31-47 (1996).

Mok et al., "Surface Modification of Polyethersulfone Hollow-Fiber Membranes by Y-Ray Irradiation", J.App.Polym.Sci., 51, 193-199 (1994).

Hautojarvi et al., "Characterization of Graft-Modified Porous Polymer Membranes", Ind.Eng.Chem.Res., 35, 450-457 (1996).

Hunt et al., "End-Functionalized Polymers. 1. Synthesis and Characterization of Perfluoralkyl-Terminated Polymers via Chorosilane Derivatives", Macromolecules, 26, 4854 (1993).

Elman et al., "A Neutron Reflectivity Investigation of Surface and Interface Segregation of Polymer Functional End Groups", Macromolecules, 27, 5341 (1994).

Affrossman et al., "Surface Segregation in Blends of Hydrogenous Polystyrene and Perfluorohexane End-Capped Deuterated Polystyrene, Studied by SSIMS and XPS", Macromolecules, 27, 1588 (1994).

Schaub et al., "Surface Modification via Chain End Segregation in Polymer Blends", Macromolecules, 29, 3982-3990, (1996).

* cited by examiner

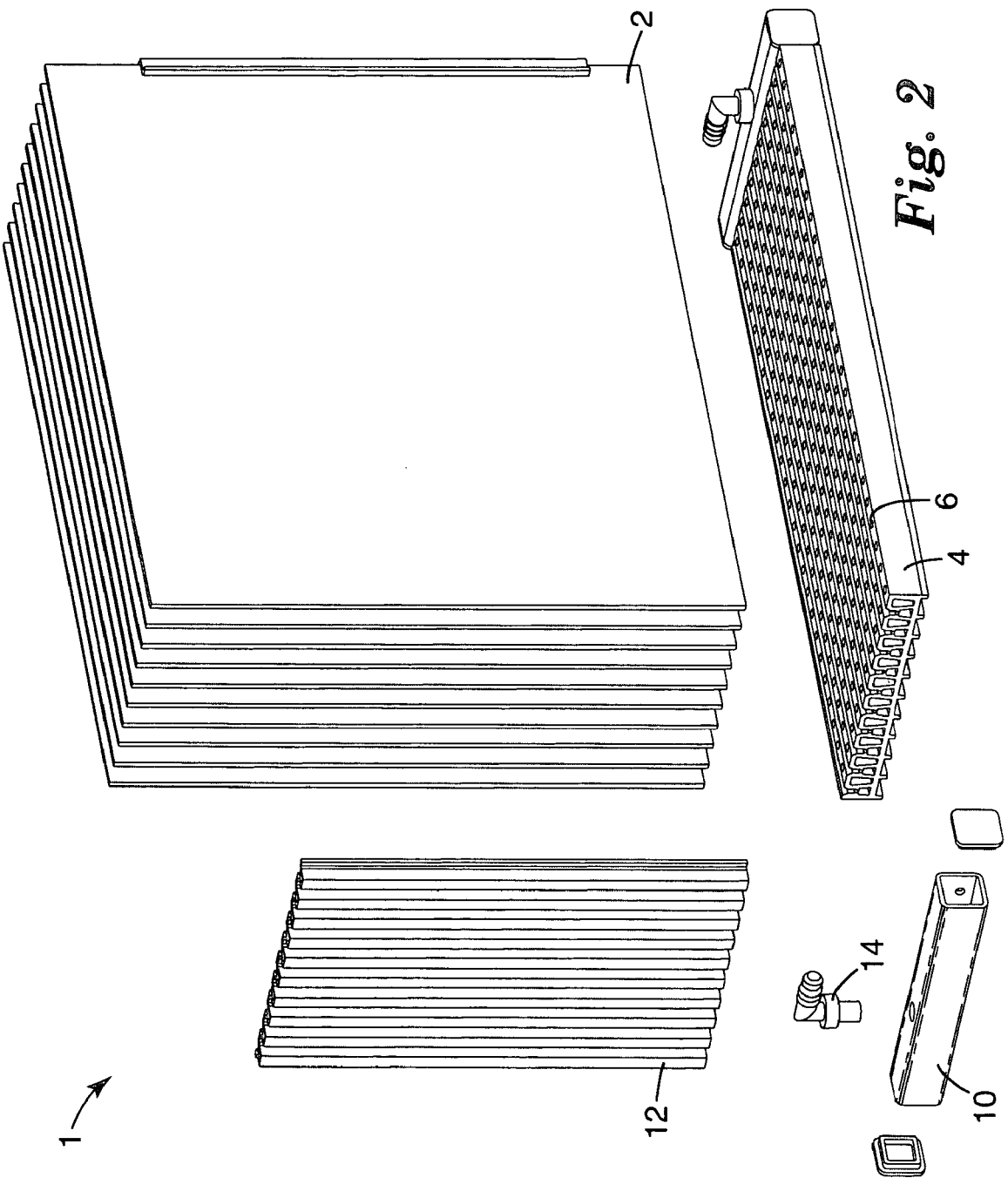

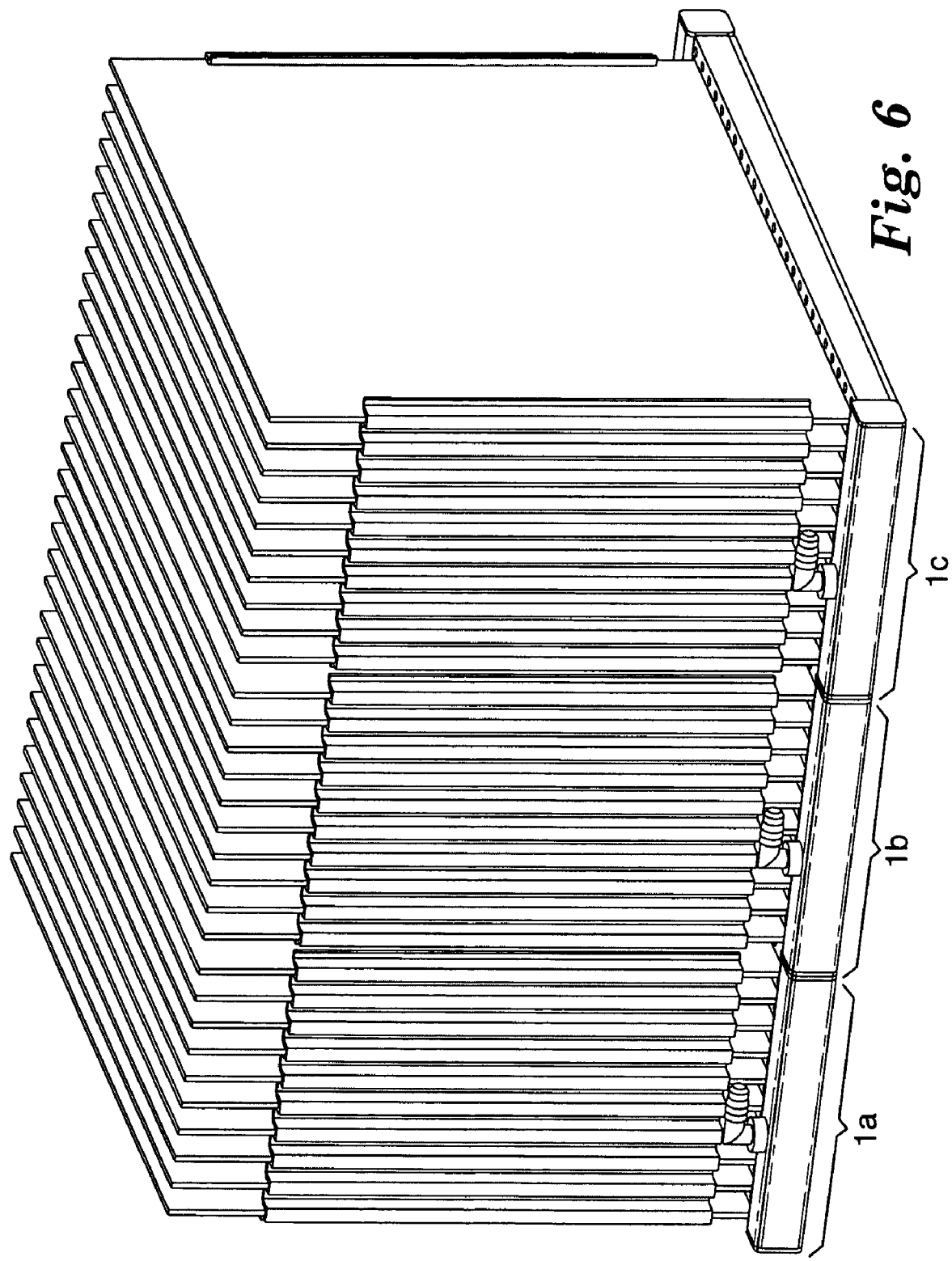

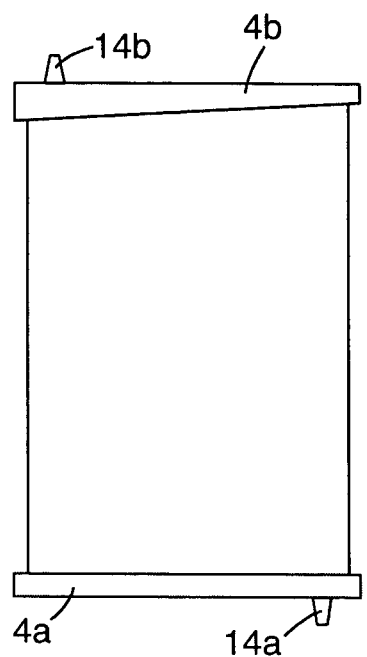
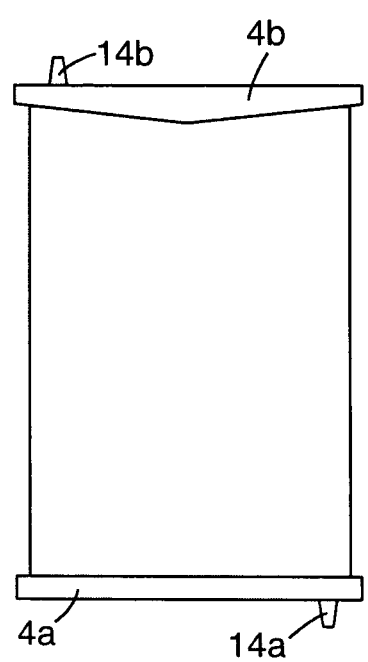
Fig. 14A          Fig. 14B
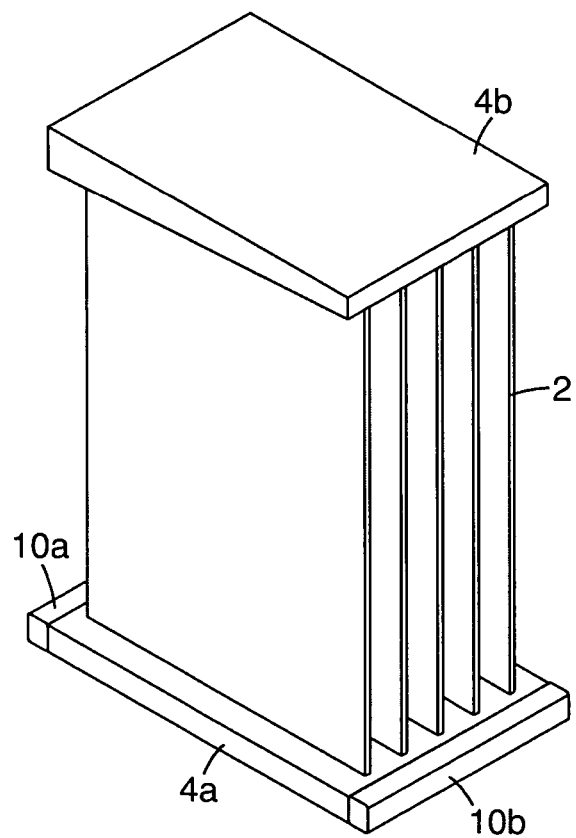
Fig. 15

MEMBRANE MODULES AND INTEGRATED MEMBRANE CASSETTES

FIELD OF THE INVENTION

The present invention generally relates to an integrated membrane assembly that can be used to selectively transfer a constituent to or from a fluid. More specifically, the present invention relates to integrated flat-sheet membrane cassettes useful for membrane bioreactors (MBRs), membrane aeration bioreactors (MABRs), extractive membrane bioreactors (EMBRs), and other filtration and mass transfer apparatuses.

BACKGROUND

Water treatment processes commonly utilize microbes, such as bacteria, to catalyze the degradation of unwanted materials in water. The microbes use the unwanted material as a fuel source thereby removing it from the water. Some standard processes for biological purification of wastewater include activated sludge, trickling filter, and rotary disk aeration processes and the like.

One problem common to these conventional water treatment processes is that they require large equipment and process footprints because of their small treatment capacity per unit volume. The activated sludge process suffers from other particular deficiencies. For example, it requires aeration of wastewater through the intensive introduction of air bubbles to the water ("sparging"), which can be very expensive due to the large amounts of energy needed to operate conventional sparging equipment, and which causes difficulty in controlling aeration and mixing of the wastewater independently. In addition, sparging is inefficient in that a large percentage of the input gas is lost when the bubbles burst at the top of the aeration tank, unless capital-intensive gas recycling is used. Another disadvantage of the activated sludge process is that the population of microbes in the reactor typically comprises mainly aerobic microbes, whereas anaerobic microbes are additionally required for the complete or nearly complete removal of some contaminants. Yet another disadvantage is that the process requires the treated liquid, including the microbes in the liquid, to go to settling tanks where it remains for some time to allow the microbes to settle out of the liquid, so that they can be recycled back to the reactor. Still another disadvantage of the activated sludge process is that it generates a large quantity of excess microbes, the disposal of which is energy intensive and costly.

A variety of membrane technologies have been developed to address some of the problems presented by the treatment of wastewater. For example, membrane bioreactors (MBRs) have been developed to replace the conventional secondary settling tanks commonly found in municipal wastewater treatment plants. In this capacity, MBRs essentially function as liquid filters. Water in the activated sludge tank is drawn through the water-permeable MBR membrane, while suspended solids, bacteria, and most viruses are retained. By acting as a filter for bacteria, MBRs provide a number of advantages over more conventional settling tanks, such as providing higher microbial cell retention times and concentrations, reduced production of excess microbes, and smaller process footprints.

In addition, membrane aeration bioreactors (MABRs) have been developed with the potential to replace the conventional air spargers commonly used in activated sludge tanks. These spargers serve to deliver air bubbles (containing oxygen) to suspended bacteria, which catalyze the oxidation of organic contaminants in the water. Using a MABR, a microbial film is grown on a water impermeable, gas permeable membrane, and a gas is delivered directly to the microbial film through the membrane. When air or another oxygen-containing gas is supplied through the membranes, the resulting microbial film may comprise both aerobic and anaerobic types of bacteria in a wider variety than that typically found in a conventional sparged tank, thereby resulting in enhanced removal of nitrogen and other contaminants. MABRs are also a more energy efficient means for the delivery of oxygen to the microbes and thus are potentially less expensive to operate than conventional air spargers. Besides oxygen-containing gases, MABR membranes may be used to deliver other gases to microbes in water. For example, gas mixtures containing methane may be advantageously used when the microbial population comprises methylotrophic bacteria.

Extractive membrane bioreactors (EMBRs) are a third membrane-based technology used in wastewater and waste gas treatment. In this application, membranes are used to extract degradable, water-soluble organic molecules from a fluid into an aqueous medium. The extracted organic constituents are treated by microorganisms disposed either in the aqueous medium or in an external biological reactor.

Other applications of membrane technologies include liquid degassing, in which a soluble gas is extracted from a liquid (e.g., water) disposed on one side of a gas permeable membrane by crossing the membrane into a liquid or gas disposed on the opposite side of the membrane. Liquid degassing is useful, for example, in the production of ultrapure water. A similar process, called pervaporation, is used to extract volatile organic compounds from a liquid disposed on one side of a selectively permeable membrane, the volatile organic compounds passing through the membrane into a fluid stream disposed on the opposite side. Membrane technologies are also used for humidification, in which an initially dry gas disposed on one side of a selectively permeable membrane becomes humidified by the passage of water vapor across the membrane, the water vapor originating from liquid water disposed on the opposite side of the membrane. Another application of membrane technologies is liquid gasification, in which at least one constituent of a gas mixture disposed on one side of a selectively permeable membrane is transported through the membrane and thereby dissolved in a liquid disposed on the opposite side of the membrane.

The fluid membrane devices described above, e.g. MBRs, MABRs and/or EMBRs, generally have one of the following membrane constructions: tubular, hollow fiber, or flat sheet porous membranes. Flat sheet porous membranes can be assembled into pleated cartridges, spirally-wound modules, or plate-and-frame configurations. Plate-and-frame flat sheet membrane modules are typically easier to clean than other types of membrane modules. Flat sheet porous membranes that are included as part of plate-and-frame modules along with hollow fibers membranes are the predominate forms of membrane configurations currently used in the processing of wastewater. However, need remains for membrane devices that are capable of assisting in water and wastewater treatment, especially on the larger scale required for municipal and/or industrial wastewater treatment.

SUMMARY

The present invention features a membrane module for transferring a constituent to or from fluid. The module of the invention includes at least two flat sheet membrane elements, each element having an interior portion and an exterior portion; and at least one primary manifold that is attached to the membrane elements. The primary manifold is connected to the interior portion of the membrane elements and is thereby able to transfer fluids (either liquids or gases, or mixtures thereof) to or from these interior regions.

In various embodiments of the invention, the membrane module further includes a space between the membrane elements, and a means for delivering gas bubbles to the space between the membrane elements when the membrane module is immersed in a liquid, e.g. water. A spacer may be used to separate adjacent membrane elements, holding them in place a fixed distance apart. Typically, the bubbles delivered to the space between the membrane elements range in size from about 0.5 mm to about 50 mm, and more typically from about 1 mm to about 12 mm.

In one embodiment of the invention, the primary manifold that is attached to the membrane elements comprises at least one fluid flow channel that carries a fluid to or from the interior portion of the membrane elements. In other embodiments, the manifold may further comprise a second flow channel that carries a gas for delivery to the space between the membrane elements.

In yet another embodiment, the manifold comprises perforations that are capable of receiving gas bubbles dispensed from below the membrane module and delivering the bubbles to the space between the membrane elements. Optionally, the manifold may comprise V-shaped or angled channels disposed below the perforations, such that fine bubbles dispensed from below the membrane module are combined together to form large bubbles that enter the space between the membrane elements through the perforations. Alternatively, the perforations may allow for the passage of gas bubbles dispensed from a flow channel in the primary manifold to the inter-membrane spaces.

The module may optionally include a second primary manifold that is preferably positioned at the opposing end of the membrane elements. The second primary manifold may be configured so as to disperse the gas bubbles that are delivered to the spaces between the membrane elements, thereby preventing the gas bubbles from collecting within the module. For example, the second primary manifold may contain perforations or have a beveled or angled shape to allow the gas bubbles to disperse.

In certain embodiments, the module also includes at least one secondary manifold that is connected to a primary manifold and delivers a fluid to and/or from the primary manifold.

The membrane modules of the invention may be further assembled to form membrane cassettes. The membrane cassettes comprise at least two membrane modules that have been connected together. The cassettes may be housed with a frame that supports and protects the components of the membrane modules and holds them in place.

The membrane cassettes can be used in a variety of applications depending on the particular membrane elements used. For example, cassettes comprising filtration membrane elements or membrane elements designed for selective mass transfer can be used in municipal, industrial, or residential (septic) wastewater treatment facilities (e.g. as MBRs, MABRs, or EMBRs); in facilities for the production of potable or ultrapure water; or in any other application in which a constituent of one fluid is transferred to a second fluid through a selectively permeable membrane, or in which a constituent of a fluid mixture is concentrated as the fluid passes through a selectively permeable membrane resulting in the production of a fluid mixture leaner in said constituent downstream of the membrane.

Other features and advantages of the present invention will be apparent from the following detailed description, the drawings and the claims.

Definitions

By "fluid" is meant either a liquid or a gas, or any mixture thereof. "Fluid" is also used to mean a liquid mixture which may contain suspended solids.

By "membrane element" is meant a membrane construction defining an interior space and an exterior space divided by a selectively fluid permeable membrane.

A "membrane construction" means having a membrane on a support (or a membrane that is otherwise self supporting) such that the membrane permits selective transport of at least one constituent of a fluid mixture through the membrane while selectively precluding transport of other constituents, or such that at least one constituent of a first fluid mixture A can be transported across the membrane to a second fluid mixture B disposed on the opposite side of the membrane without the transport of at least one constituent of fluid mixture B into fluid mixture A.

By "flat sheet membrane element" is meant a membrane element that optionally includes a support plate acting as a fluid delivery or collection layer, and one or two selectively fluid permeable flat-sheet membranes.

A "flat sheet" means having a construction in the form of a sheet, which is a broad, substantially flat mass having a continuous surface or surfaces.

By "membrane module" is meant an assembly of two or more membrane elements connected, preferably permanently, to one or more common primary manifolds.

By "membrane cassette" is meant an integrated assembly comprising two or more membrane modules that are collectively manifolded for the conveyance of fluid to and/or from the interior of the membrane elements. Optionally, membrane cassettes may have additional assemblies for the generation of gas bubbles and/or controlled liquid flows, and for providing liquid and/or gas delivery to or from membrane elements via a primary manifold and optionally secondary manifolds.

By "manifold" is meant a structure that enables the conveyance of a fluid between two locations.

By "primary manifold" is meant a manifold connected to one or more membrane elements to provide for the conveyance of a fluid to or from the interior portion of each membrane element.

By "secondary manifold" is meant a manifold connected to at least one primary manifold to provide for the conveyance of a fluid to or from the interior of the primary manifold.

By "manifolded" is meant a connection or attachment formed between two or more structural elements, e.g. membrane elements, via a manifold.

By "fluid connection" is meant that two or more components or compartments are connected so as to allow the passage of a fluid between them.

BRIEF DESCRIPTION OF THE DRAWINGS

FIG. 2 is a schematic diagram showing the separate components of a membrane module.

FIG. 6 is a schematic diagram showing a group of membrane modules assembled together to form an integrated membrane cassette.

FIGS. 14A and 14B are schematic diagrams showing membrane modules having beveled primary manifolds located at one end (e.g. the top) of the module to allow for rising gas bubbles to escape at the side of the membrane module.

FIG. 15 is a diagram showing a flow-through type membrane module with a beveled top primary manifold to facilitate the dispersion of bubbles and a primary manifold located at the base of the module that is attached to two secondary manifolds.

DETAILED DESCRIPTION

The present invention provides integrated membrane assemblies that can be used to selectively transfer a constituent to or from a fluid. More specifically, the invention features membrane modules that comprise two or more membrane elements that are attached to a common manifold. Two or more membrane modules can be combined to form integrated membrane cassettes that are useful for a variety of liquid filtration and fluid delivery applications. In particular, these cassettes can be placed in a tank of water or other fluid in order to assist in filtration, purification, and/or other water or wastewater treatment processes.

Figure 1:
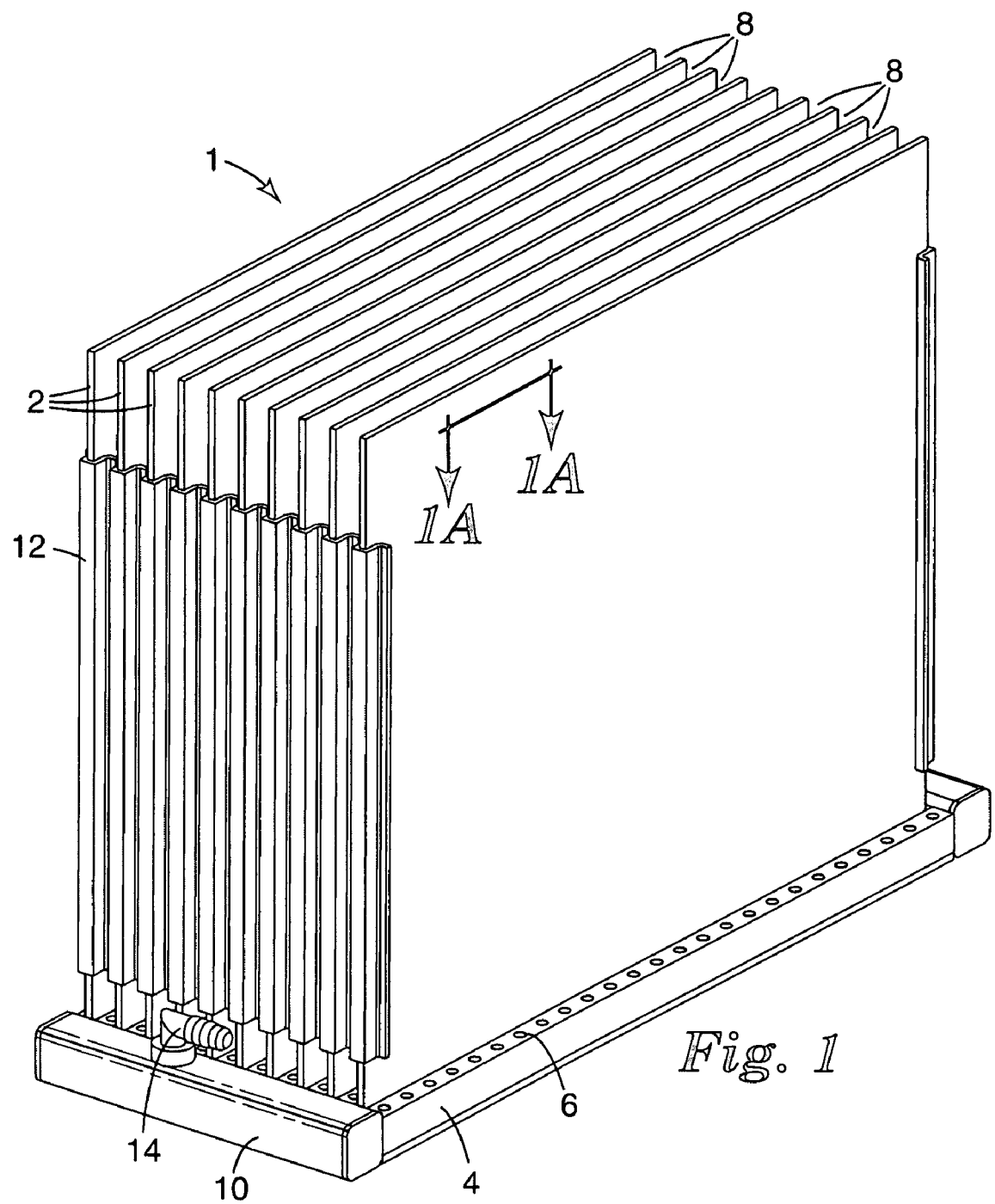
FIG. 1 is a schematic diagram of a membrane module having a "dead-end" configuration, including a cross-sectional view of a membrane element (1A).
Figure 1A:
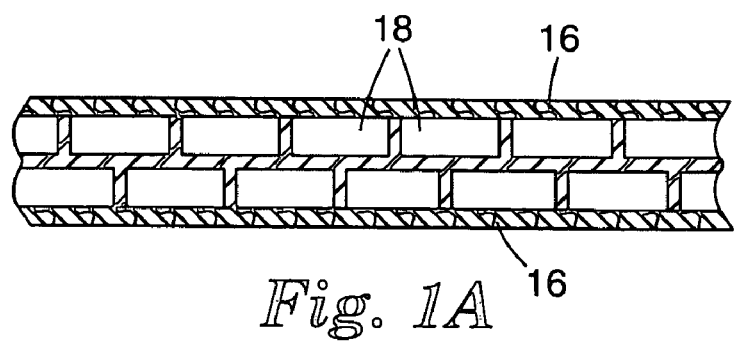

An exemplary membrane module 1 according to the invention is depicted in FIGS. 1 and 2. The membrane module 1 includes a plurality of flat-sheet membrane elements 2, each of which is attached to a common primary manifold 4. This primary manifold 4 may have perforations 6 for providing gas bubbles to the spaces 8 between the flat-sheet membrane elements 2. In one embodiment, the membrane elements 2 have outer membrane surfaces 16 and interior spaces 18, as shown in FIG. 1A. The primary manifold 4 is connected to interior spaces 18 of each of the flat-sheet membrane elements 2, and is thereby able to deliver or remove a fluid to these internal spaces 18. All of the edges of the membrane elements that are not connected to the manifold 4 are preferably sealed, for example with a pressure sensitive adhesive tape, to prevent leakage of fluid into or out of the interior passages of the membrane elements. Alternatively, the edges may be sealed by other methods, for example, by thermal bonding, ultrasonic bonding, radio frequency bonding, adhesive bonding or the application of an adhesive seal, microwave processing using an appropriate microwave susceptor, or a combination of the above named methods. Any method may be used to seal the edges of the membrane elements not connected to the primary manifold, provided that the seals so formed are preferably substantially impermeable to water and structurally sound.

There are a variety of flat-sheet membrane elements that are suitable for use in the membrane modules and cassettes of the present invention. For example, U.S. Ser. No. 10/017,632 filed Dec. 14, 2001, now U.S. Pat. No. 7,140,495 U.S. Ser. No. 10/437,799 filed May 14, 2003, now U.S. Pat. No. 7,114,621, and U.S. Ser. No. 10/438,090 filed May 14, 2003, now U.S. Pat. No. 6,986,428, each of which is incorporated herein by reference in its entirety, all describe flat sheet membranes that may be manifolded together to create a membrane module in accordance with the invention. In certain implementations, the membrane elements are MBR, MABR, or EMBR type membranes. Typical MBRs membrane elements comprise water-permeable, microporous membranes. These membranes form the outer walls of the membrane elements and allow water to pass through into the interior passages of the membrane element. Though water-permeable, the membranes block bacteria and most particles, and thus water is filtered as it passes through the membrane walls into the interior passages of the membrane elements.

MABR membrane elements are useful for growing microbial films. The microbes help in water treatment by consuming and degrading unwanted materials in the water. MABRs generally comprise membranes that are gas permeable, but water impermeable. The microbial film is grown on the outer surface of the membrane and air or another gas is delivered to the microbes by passing from the interior regions of the membrane element through the membrane wall and directly into the microbial film growing on the outer surface of the membrane. Gases may also be supplied to the microbial films growing on the membranes, and/or microorganisms suspended in the water between the membranes, via gas bubbles that are delivered to the spaces between the membrane elements by, for example, the primary manifold connecting the membrane elements. In addition, gas bubbles delivered to the spaces between the membrane elements may serve to control the thickness of the microbial films grown on the membranes by removing excess microbial material as they rise between the membrane elements. Often, the gas delivered to the spaces between the membranes is air, as air contains oxygen needed by the microbes and is inexpensive to deliver.

Figure 3:
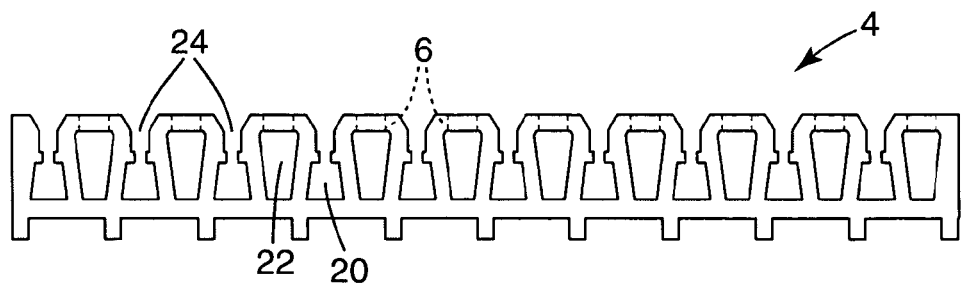
FIG. 3 is schematic diagram showing a cross-sectional view of an exemplary primary manifold useful for connecting a plurality of membrane elements.

A cross-sectional view of the primary manifold 4 is shown in FIG. 3. The primary manifold 4 comprises slots 24 for receiving membrane elements, and also contains primary flow chambers 20 that are used for conveying a fluid to or from the interior passages of the membrane elements. When an MBR membrane element is used in the module, the primary flow chambers 20 will generally be receiving fluid from the internal spaces of the membrane element as it filters liquid (e.g., water) from outside the membrane. When an MABR membrane element is used in the module, the chambers 20 can be configured either to receive gas or deliver gas to the interior spaces of the membrane. A collection of secondary flow chambers 22, which contain perforations 6, is used to deliver gas bubbles to the spaces between the membranes.

In one embodiment of the invention, a secondary manifold 10, is connected to each side of the primary manifold 4 to provide for the conveyance of a liquid and/or a gas to or from the chambers of the primary manifold (see FIGS. 1 and 2). The secondary manifold 10 generally has a fitting 14, for connecting to a fluid source or receptacle. In embodiments where the membrane module does not have a secondary manifold, the fitting 14 will attach directly to the primary manifold, as shown in FIGS. 14A and 14B.

Figure 4A:
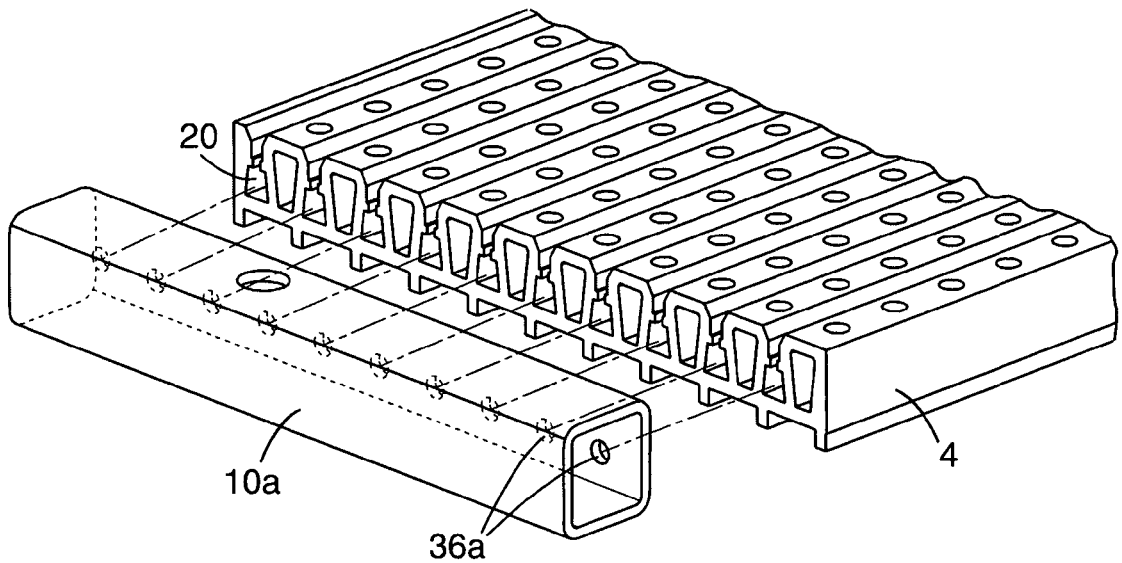
FIGS. 4A and 4B are schematic diagrams showing the attachment of two secondary manifolds to the chambers of a primary manifold.
Figure 4B:
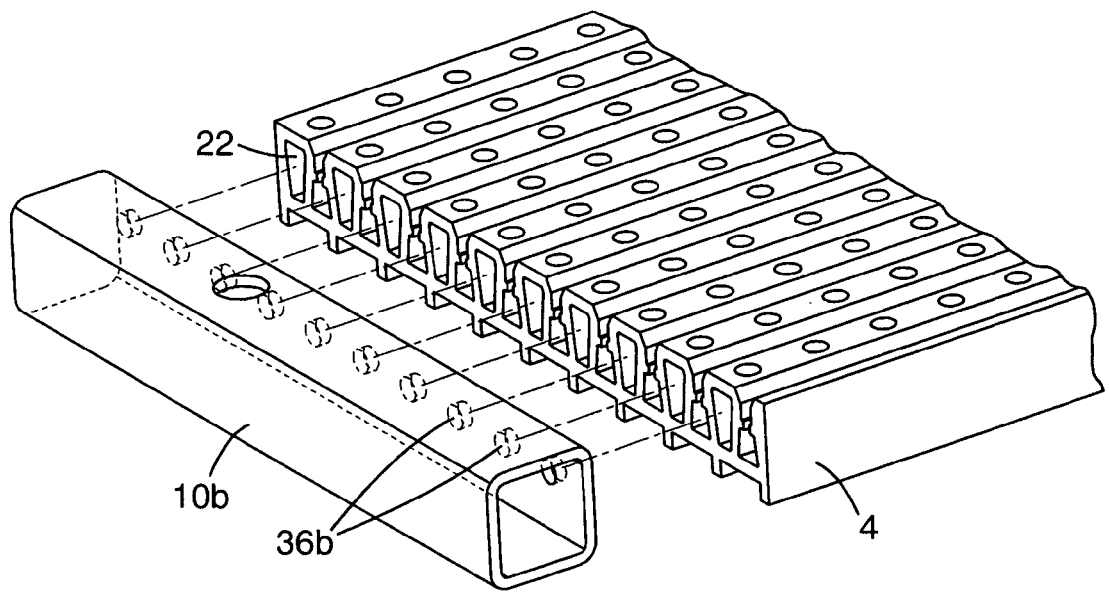

As shown in FIGS. 4A and 4B, the module may include two separate secondary manifolds 10a, 10b for delivering fluid to the chambers of the primary manifold 4. For example, one secondary manifold 10a has a series of holes 36a connecting it to the primary flow chambers 20 of the primary manifold 4, while the other secondary manifold 10b has a series of holes 36b connecting it to the secondary flow chambers 22 of the primary manifold 4. In this manner, the secondary manifolds 10a, 10b are able to supply the flow chambers 20, 22 of the primary manifold 4 with separate fluids as desired.

Figure 10:
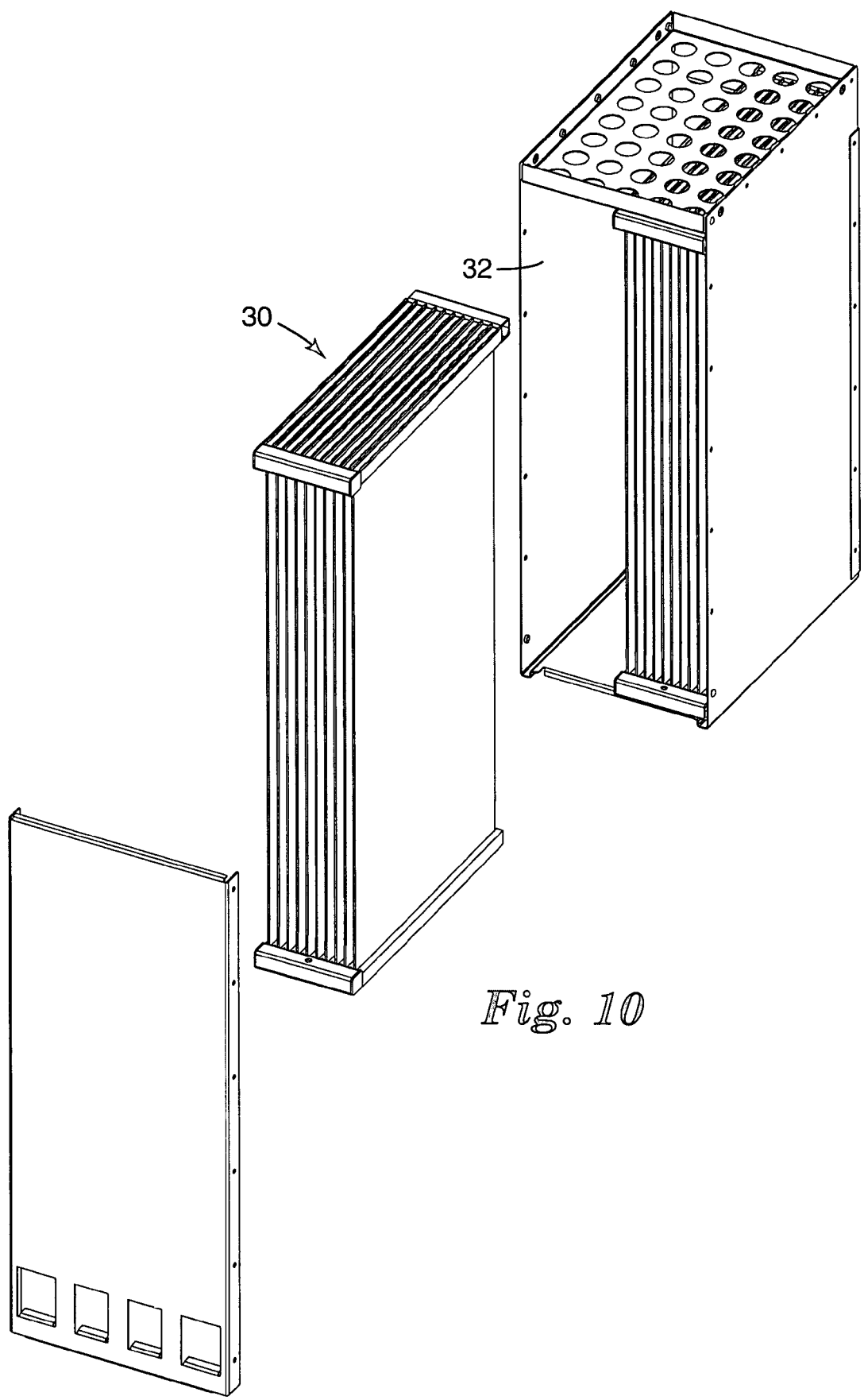
FIG. 10 is a diagram showing the assembly of a membrane cassette comprising two membrane modules having a "flow-through" design.
Figure 11:
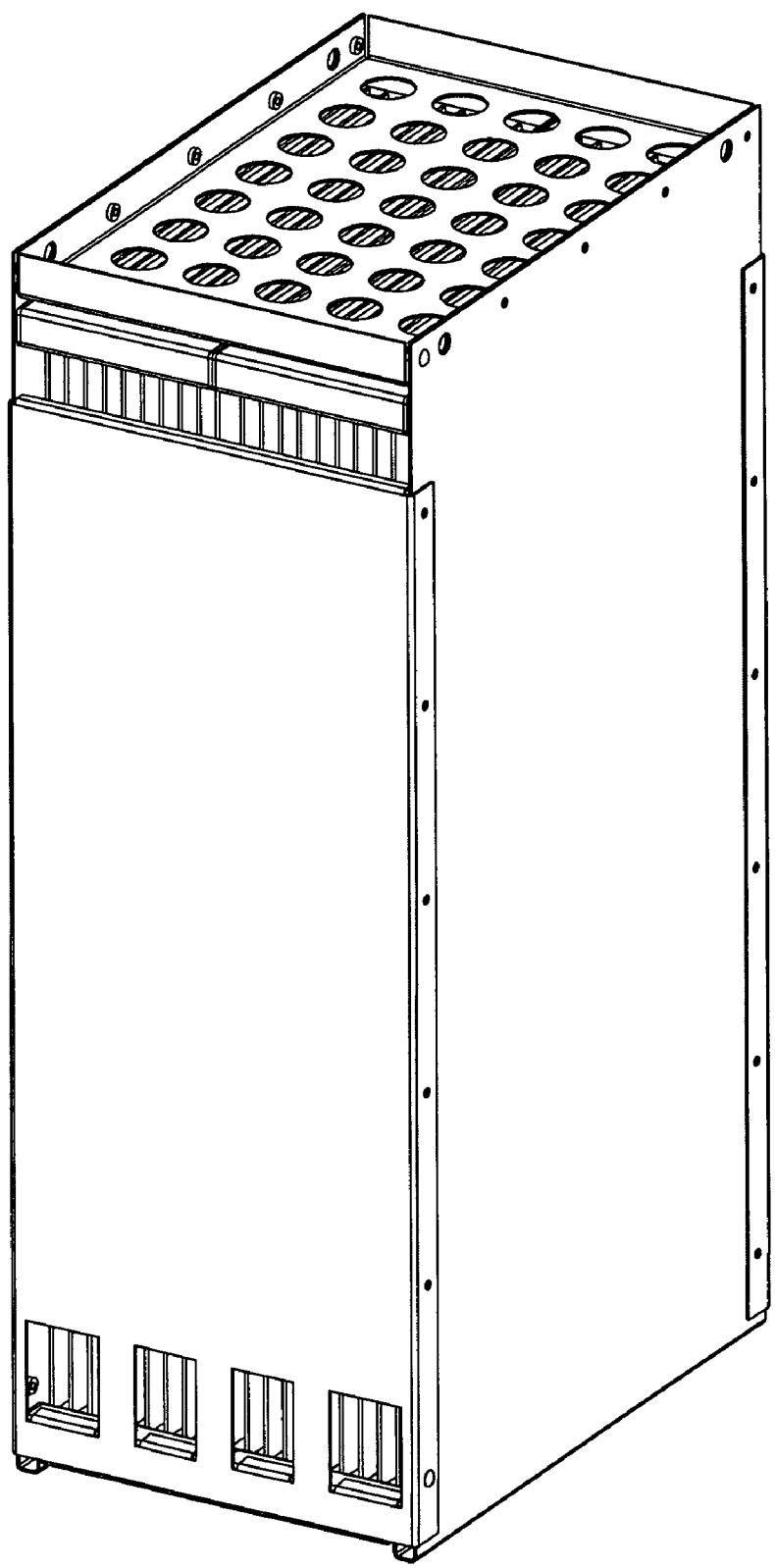
FIG. 11 is a diagram showing a fully assembled membrane cassette inside a supporting frame.

Two or more membrane modules can be integrated to form a membrane cassette. An exemplary membrane cassette, comprised of three membrane modules 1a, 1b, and 1c, is shown in FIG. 6. The cassette may also include a frame that supports the membrane elements, as well as the other components of the membrane modules, including the primary and secondary manifolds that provide a means for conveying fluid to and/or from the interior of the membrane elements. FIG. 10 illustrates how a module 30 may be paced within frame 32. In addition, the frame may support a means of conveying fluid to and/or from the primary and secondary manifolds, as well as other devices that may be used in conjunction with the membrane modules, including devices to maintain defined spaces between membrane elements, equipment for producing air bubbles for membrane scouring, water jets, and/or casing panels to direct the motion of water and/or gas bubbles between membrane elements. The integrated membrane cassettes of the invention are suitable for treating large volumes of wastewater and can be easily placed in a wastewater treatment plant.

Methods for fabricating manifolds, membrane elements, frames, and other components of the devices of the invention are well known. The various components of the membrane modules or membrane cassettes may be constructed of any suitable material and can be assembled together using any or a combination of bonding methods, preferably ones that create water-tight seals between the module components.

Figure 5A:
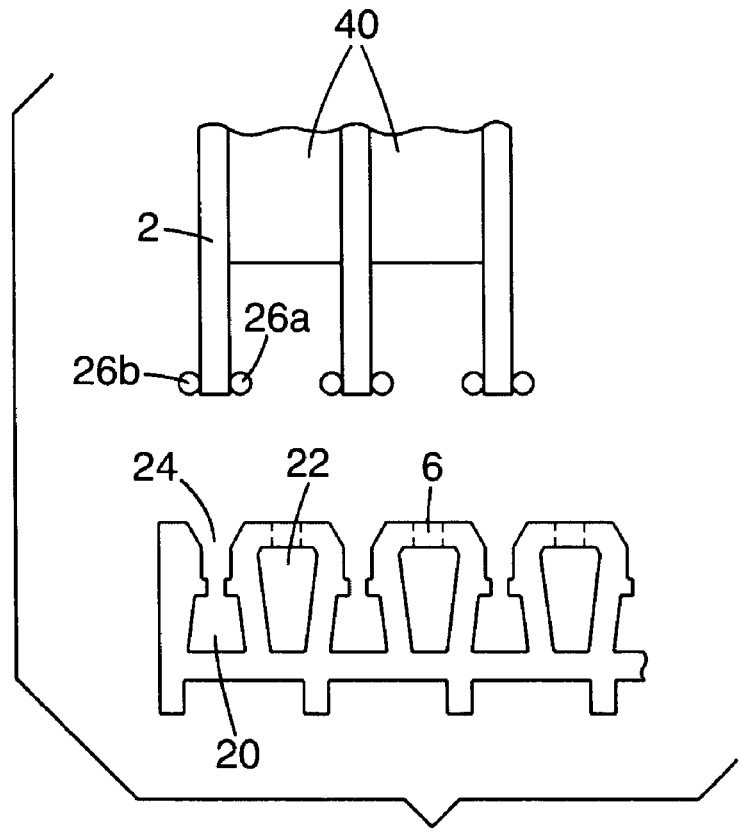
FIGS. 5A and 5B are diagrams depicting the sealing of membrane elements to the chambers of a primary manifold.
Figure 5B:
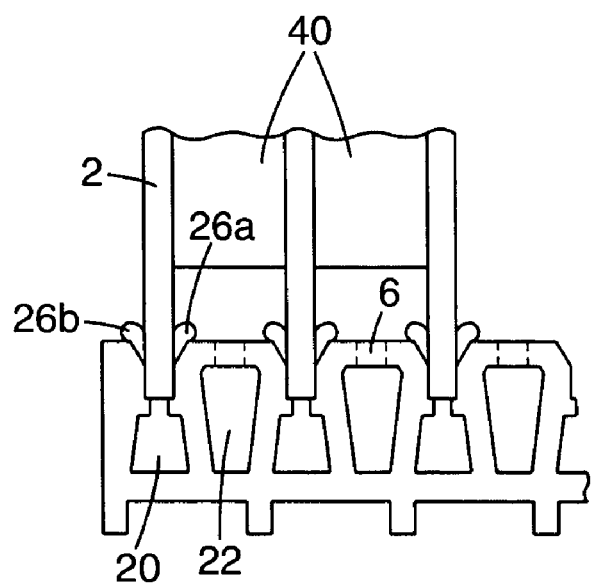

In some implementations of the invention, the membrane elements are permanently attached to the primary manifold. A variety of methods can be used to connect the membrane elements to the chambers of a primary manifold. As shown in FIGS. 5A and 5B, one method is to apply beads of sealant 26a, 26b on the outer surfaces of the membrane elements 2 at the end to be connected to the manifold 4. Adjacent to the primary fluid flow chambers 20, the manifold 4 has slots 24 with the appropriate dimension to accept the membrane elements 2. When the membrane elements 2 are placed into the slots 24 on the manifold 4, the sealant 26 bonds the membrane elements 2 to the primary manifold 4, preferably creating a water-tight seal. Alternatively, the membrane elements can be inserted into the slots in the manifold, after which sealant lines can be applied at the intersections between the membrane elements and the manifold. Preferred sealants have a worklife sufficiently long to provide for alignment and adjustment of parts during assembly, set to handling strength quickly enough to minimize fixturing time during assembly, have a viscosity sufficiently high to enable them to retain the shape of a bead when applied to the membrane surfaces but sufficiently low to flow into and fill the volume between the mated parts providing a substantially water-tight seal, exhibit high peel strength when bonded to the outer surfaces of the membrane element and the manifold, are sufficiently flexible when set to prevent cracking if the mated parts are flexed, are substantially water impermeable, and do not degrade or weaken substantially in water. An example of a suitable sealant is a two-part mercapten epoxy adhesive, available from 3M Company (St. Paul, Minn.) under the trade designation 3M™ SCOTCH-WELD™ DP-105 Clear Epoxy Adhesive, which has a worklife of 4 min., a time to handling strength of 20 min., a base viscosity of 1-5 kg/(m*s) at 27° C. and an accelerator viscosity of 8-16 kg/(m*s) at 27° C., an overlap shear strength of 6.9 kPa on polypropylene (ASTM D 1002-72), and an elongation of 120% (ASTM D 882) after curing. Alternative sealants that may be used include those comprising epoxy adhesives, polyurethane adhesives, polyester adhesives, acrylic adhesives, silicone adhesives, and other solvent-based or thermally cured sealants, adhesives, and potting compounds.

The membrane elements 2 may be sealed to the manifold 4 one at a time, or they may be placed into the slots 24 of the manifold 4 simultaneously to help ensure better alignment of the membrane elements. One way to accomplish simultaneous insertion of a plurality of membrane elements 2 into a plurality of slots 24 of the manifold 4 is to first construct a stack of alternating membrane elements 2 and spacer plates 40 as depicted in FIGS. 5A and 5B. The spacer plates 40 may be made of any suitable material and typically have an appropriate thickness such that the center-to-center spacing of the membrane elements 2 in the alternating stack is substantially equal to the center-to-center spacing of the slots 24 in the manifold 4. Beads of sealant 26a, 26b are then applied to the plurality of membrane elements, after which the manifold 4 is moved toward the alternating stack of membrane elements 2 and spacer plates 40, such that the ends of a plurality of membrane elements 2 are simultaneously inserted into the slots 24 of the manifold 4, whereupon the sealant 26 bonds the membrane elements 2 to the manifold 4. The spacer plates 40 are then removed from the spaces between the membrane elements 2. Other means can be used to facilitate bonding of the membrane elements 2 to the manifold 4 while ensuring good alignment of the membrane elements 2. For example, the membrane elements can be inserted vertically through a set of parallel slots disposed in a horizontal surface, the slots in the horizontal surface having an appropriate spacing and being disposed above the primary manifold in such a way that the membrane elements are guided into the slots in the primary manifold. Many fixtures and apparatuses can be devised to aid in the bonding of the membrane elements to the primary manifold. It is desirable that the method and apparatus used should provide water-tight seals between the membrane elements and the manifold, a high speed of fabrication, and good alignment of the membrane elements.

As mentioned above, the membrane elements of the invention are attached to at least one common manifold, and in some embodiments, the membrane elements may be attached to more than one primary manifold. The primary manifold(s) may be attached to any of the edges of the membrane elements (i.e. top, bottom, left side, or right side). The edge or edges of the membrane elements that are attached to the manifold(s) should be open to the interior portion of the membrane elements (i.e. should be unsealed) to allow fluid to pass to or from a flow channel of the manifold.

Figure 12:
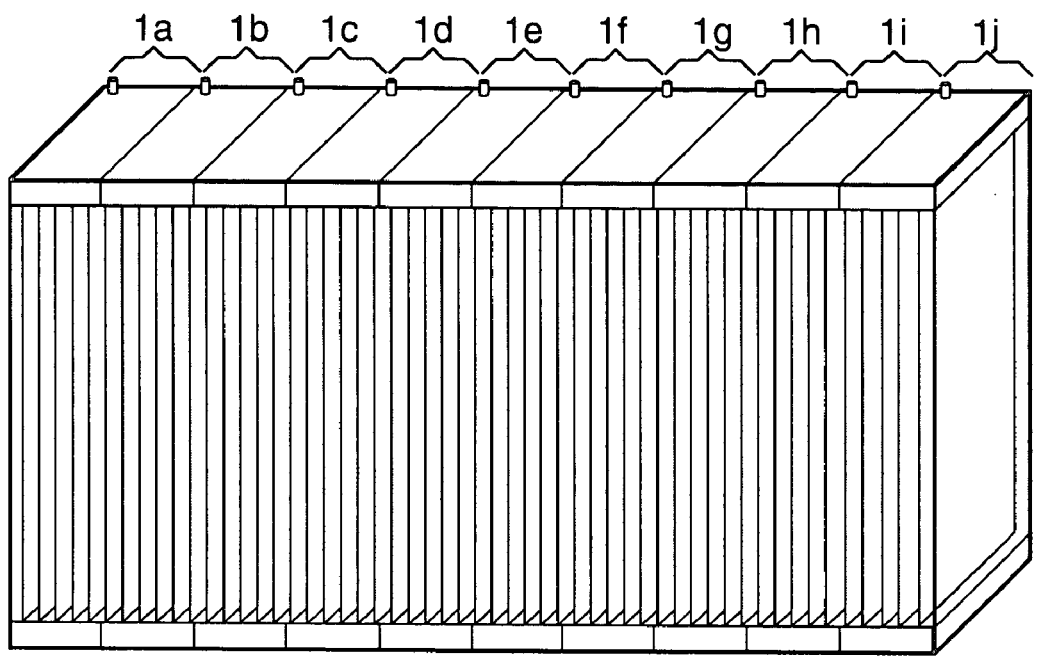
FIG. 12 is a schematic diagram of a membrane cassette in which the membrane elements are mounted vertically, with the membranes parallel to the short side of the cassette. The cassette has ten "flow-through" membrane modules, each module comprising flat-sheet membrane elements attached to primary manifolds at the top and bottom of the module.
Figure 13:
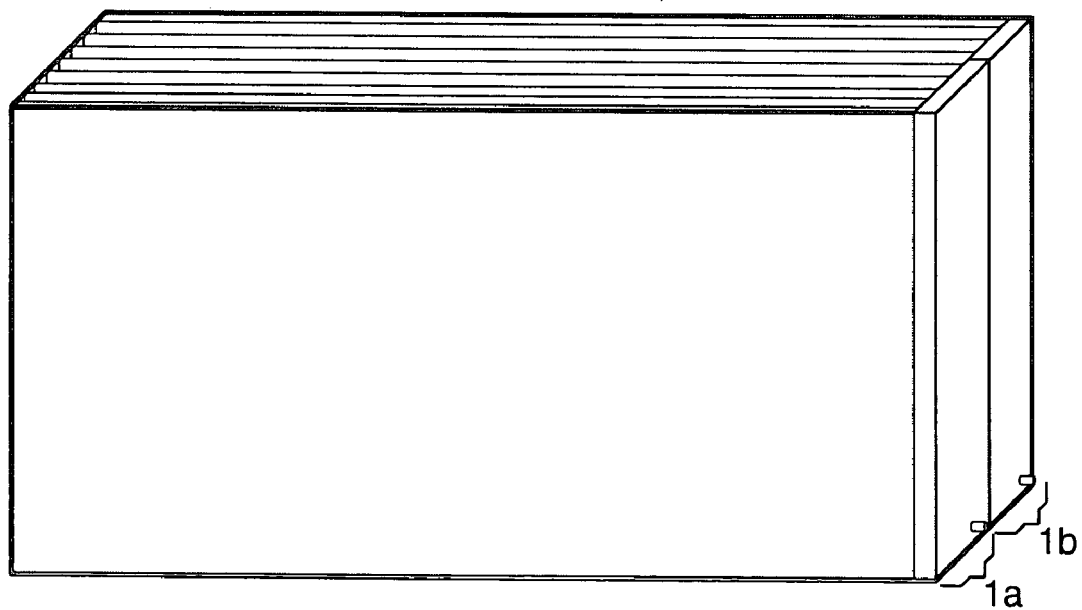
FIG. 13 is a schematic diagram showing a membrane cassette in which the membrane elements are mounted vertically, with the membranes parallel to the long side of the cassette. The cassette has two "dead-end" membrane modules (i.e. manifolded on one side only), each module comprising flat-sheet membrane elements attached to a manifold located on the side of the module.

The membrane elements may be arranged so as to be parallel to any side of the module or cassette. Membrane elements may be arranged vertically or horizontally within a module or cassette, although vertical arrangement generally provides for easier maintenance and cleaning. For example, FIG. 12 shows an embodiment of a membrane cassette in which the membrane elements are manifolded at the top and bottom of the modules (1a-1j) in a vertical arrangement and aligned parallel to the short side of the cassette. FIG. 13 shows an embodiment in which the membrane elements are manifold on one side of the modules (1a and 1b) in a vertical arrangement and aligned parallel to the long side of the cassette. These illustrate just a few of the many possible arrangements of membrane elements within the modules and cassettes.

The membrane modules depicted in FIGS. 1 and 2 have only one primary manifold and thus possess what is referred to as a "dead-end" geometry. Fluid may flow into or out of the interior of the membranes only through the single primary manifold or by passing through the membrane itself. However, in alternative embodiments, the modules may have a second primary manifold, typically connected to the opposite end of the membrane elements, in what is referred to as a "flow-through" geometry. With a flow-through arrangement, each membrane element is in fluid connection with two primary manifolds generally disposed at opposing ends of the membrane elements.

Dead-end configurations are particularly useful for MBRs in which the primary manifold provides for the removal of liquid permeating the membrane into the interior of the membrane elements. Dead-end configurations can also be used for MABRs in which the primary manifold provides for delivery of a gas to the interior of the membrane elements under pressure, the only exit for the gas being transport through the membrane. Flow-through configurations are useful for MABRs in which it is desired that gas be conveyed through the membrane elements from an upstream primary manifold to a downstream primary manifold such that only a fraction of the input gas is transported through the membrane, the balance being exhausted through the downstream primary manifold.

Figure 7A:
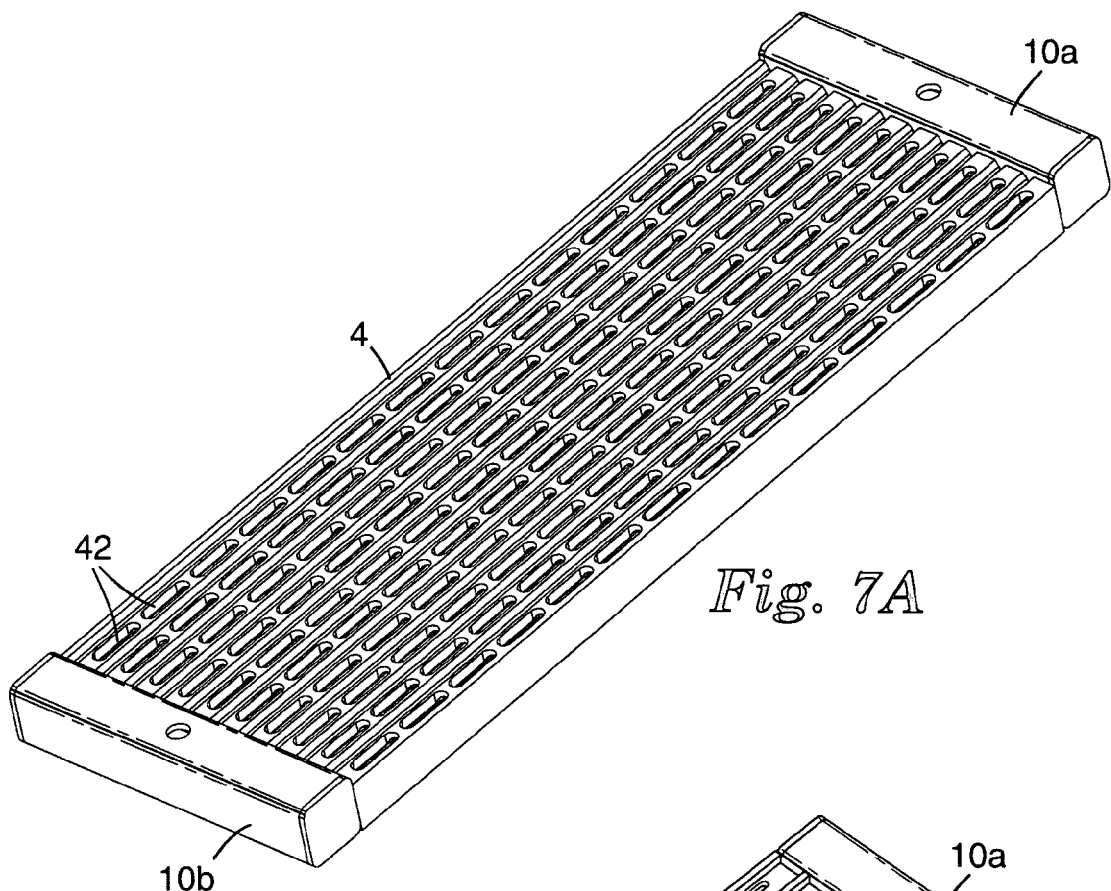
FIGS. 7A and 7B are diagrams showing a profile extruded primary manifold from (A) the side that attaches to the membrane elements and (B) the side opposite to the side that attaches to the membrane elements.
Figure 7B:
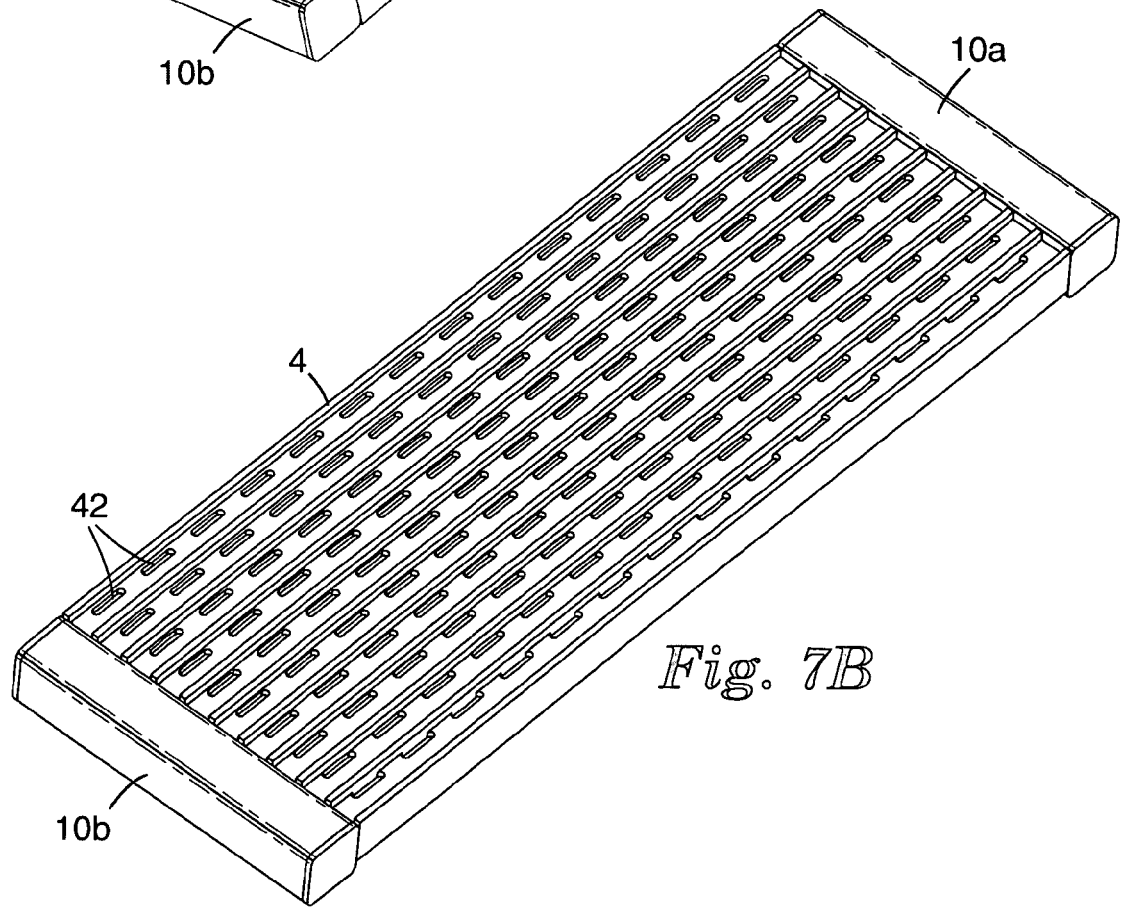
Figure 8:
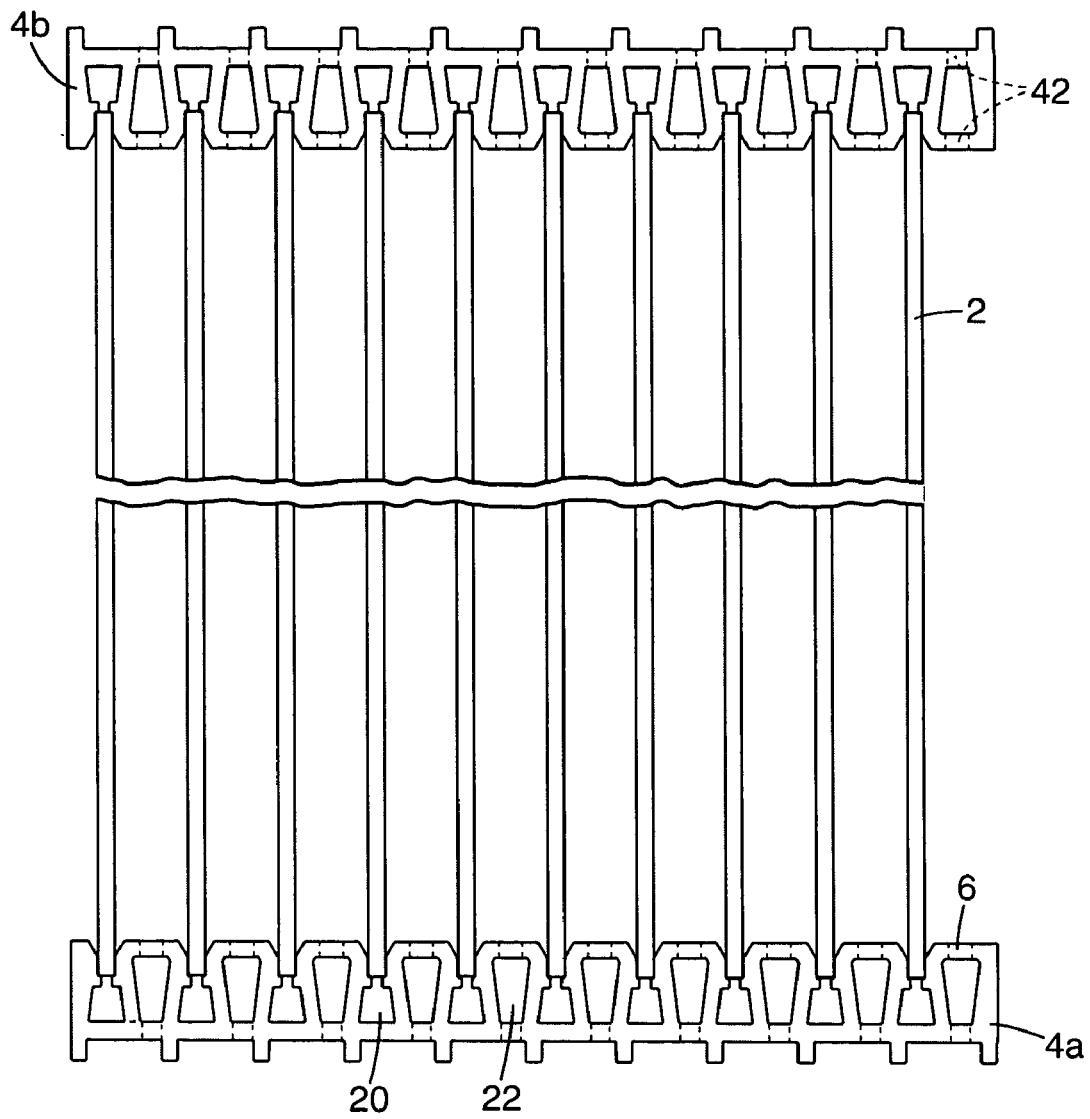
FIG. 8 shows a cross-sectional view of a membrane module having a "flow-through" arrangement, comprising two primary manifolds to allow the flow of a fluid into one end of the membrane elements and out of the opposite end, the primary manifolds being configured to allow bubbles introduced into the space between the membrane elements to escape the module at the top.

In one embodiment of a flow-through design, one primary manifold is located at the base the membrane elements and a second primary manifold is located at the top, as shown in FIGS. 8 and 10. FIG. 8 shows a membrane module comprising membrane elements 2 attached to two common primary manifolds 4a and 4b. The bottom primary manifold 4a comprises flow chambers 22 and perforations 6 for the delivery of gas bubbles to the spaces between the membrane elements 2. In some implementations, the flow chambers of the bottom manifold may also have perforations on the opposing (bottom) side of the chamber, such as where membrane modules are stacked vertically on top of each other, or where gas bubbles are produced from below the module. The manifold located at the top of the module may be adapted for dispersing rising bubbles that are delivered into the space between the membrane elements by the primary manifold located at the base of the module. For example, the manifold at the top of the module may have perforations 6 in the secondary chambers allowing them to receive the rising bubbles and permit the bubbles to pass through the manifold without collecting in the module. FIG. 8 illustrates how the top manifold 4b may include perforations or slots 42 to allow gas bubbles to pass through the manifold 4b and thus escape the membrane module. FIGS. 7A and 7B, also depict a manifold 4 having through-slots 42 that allow air bubbles to pass entirely through the manifold. In alternative embodiments, the top manifold may have a beveled or angled shape as show in FIGS. 14A, 14B and 15. As rising bubbles come into contact with the manifold, the angled shape directs the bubbles to the sides of the modules, thereby preventing the bubbles from collecting in the device.

Although the primary manifold itself may be configured to deliver bubbles to the spaces between the membrane elements of a membrane module, alternatively the modules or cassettes may include a separate device for generating gas bubbles. Means for providing air bubbles to membrane elements have been described in, for example, U.S. Pat. No. 5,192,456 and U.S. Pat. No. 6,294,039, which are herein incorporated by references in their entirety. One purpose for delivering gas bubbles to the spaces between the membrane elements is for bubble scrubbing of the membranes. Scrubbing occurs as the bubbles rise upwards through the cassette, passing between the adjacent membrane elements. It is desirable to obtain an optimal bubble size, such that the rising bubbles impinge simultaneously on both adjacent membranes as they rise, creating sufficient shear forces at the membrane surfaces to remove accumulated foulants.

Figure 9:
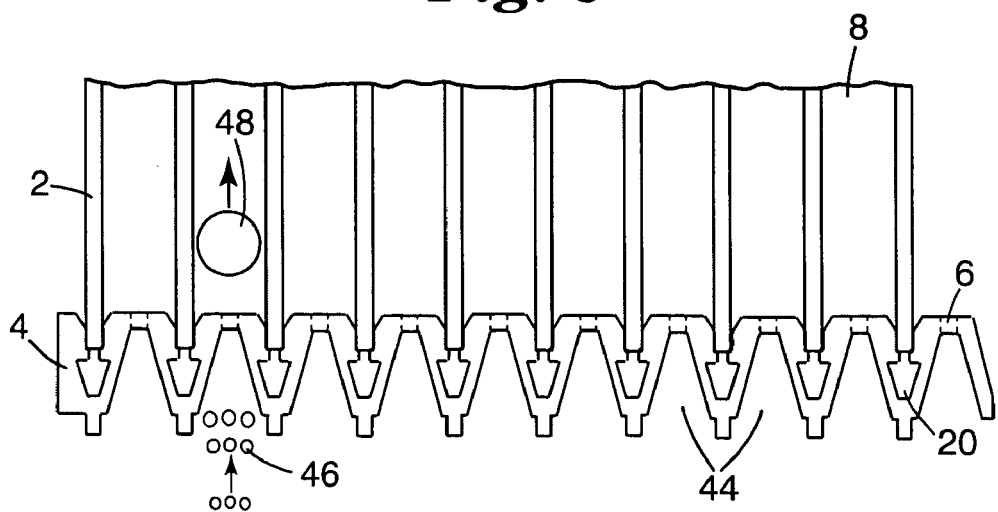
FIG. 9 shows a cross-sectional view of the bottom portion of a membrane module designed to combine fine bubbles dispensed below the membrane module into larger bubbles that enter the spaces between the membrane elements through perforations in the manifold.

In some applications, it is desirable to provide both fine bubbles (for oxygen transfer to the water being treated) and coarse bubbles (for membrane scrubbing) in the same module or cassette. This is often advantageous, since fine bubbles (ranging in size from approximately 0.5 mm to approximately 5 mm in diameter) are effective for transferring oxygen to microbes in the water, whereas larger bubbles are often more effective for bubble scrubbing of the membranes. FIG. 9 shows a cross-sectional view of the bottom primary manifold 4 and lower portions of the membrane elements 2 of an exemplary membrane module configured to provide both fine bubbles 46 and coarse bubbles 48. Fine bubbles 46 are dispensed from below the membrane module by any of a variety of means which are well known. V-shaped or slanted channels 44 in the manifold 4 combine the fine bubbles 46 into larger bubbles 48 that are introduced into the spaces 8 between the membrane elements 2 through perforations 6 in the manifold 4.

In arrangements such as that depicted in FIG. 13, where the membrane modules are manifolded on the sides of the membrane elements, the top and bottom of the membrane elements are free for gas bubble delivery via a dedicated gas supply device (not shown). The depth of the gas supply device relative to the membrane elements can be used to tune the average size of the bubbles impinging the membranes. Additionally, means of combining bubbles, such as a set of angled baffles, could be disposed between the air delivery manifold and the bottom of the membrane, for the purpose of combining fine bubbles into coarse bubbles of a controlled size prior to contact between the bubbles and the membranes.

In certain embodiments of the invention, it is desirable to keep the panels or flat-sheet membrane elements substantially straight and maintain the appropriate panel-to-panel spacing. This can be accomplished, for example, by applying tension at the ends of the manifold. The tension can be maintained by tie rods or a structural component in the frame that spaces and/or holds the manifolded panels together. Tensioning of this type can be done at the manifolded or non-manifolded ends.

Figure 16A:
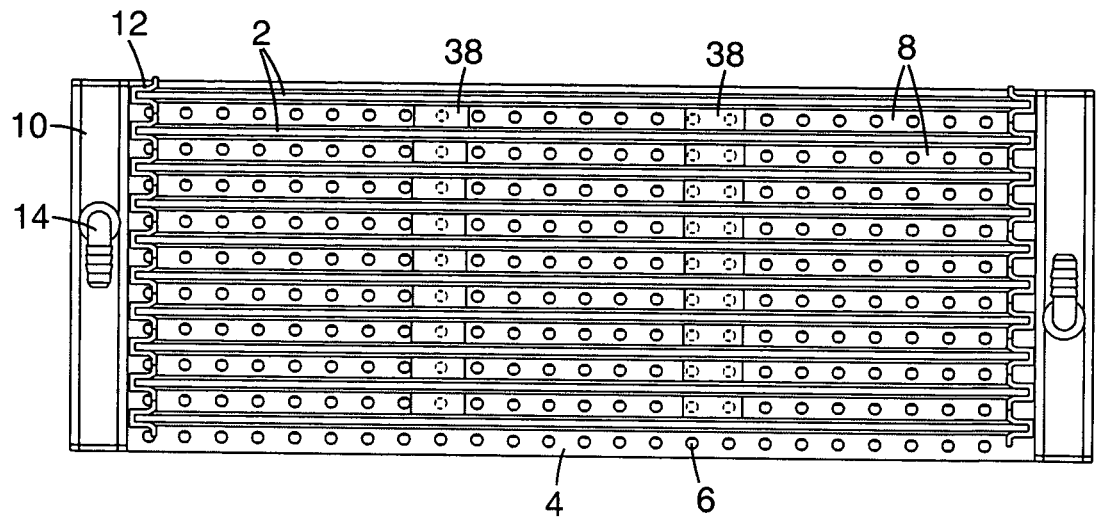
FIGS. 16A and 16B are diagrams showing a top view and a front view, respectively, of a membrane module comprising edge spacers, disposed on the side edges of the membrane elements, and discrete spacers, disposed in the spaces between adjacent membrane elements, both of which types of spacers aid in the maintenance of a uniform spacing between the membrane elements.
Figure 16B:
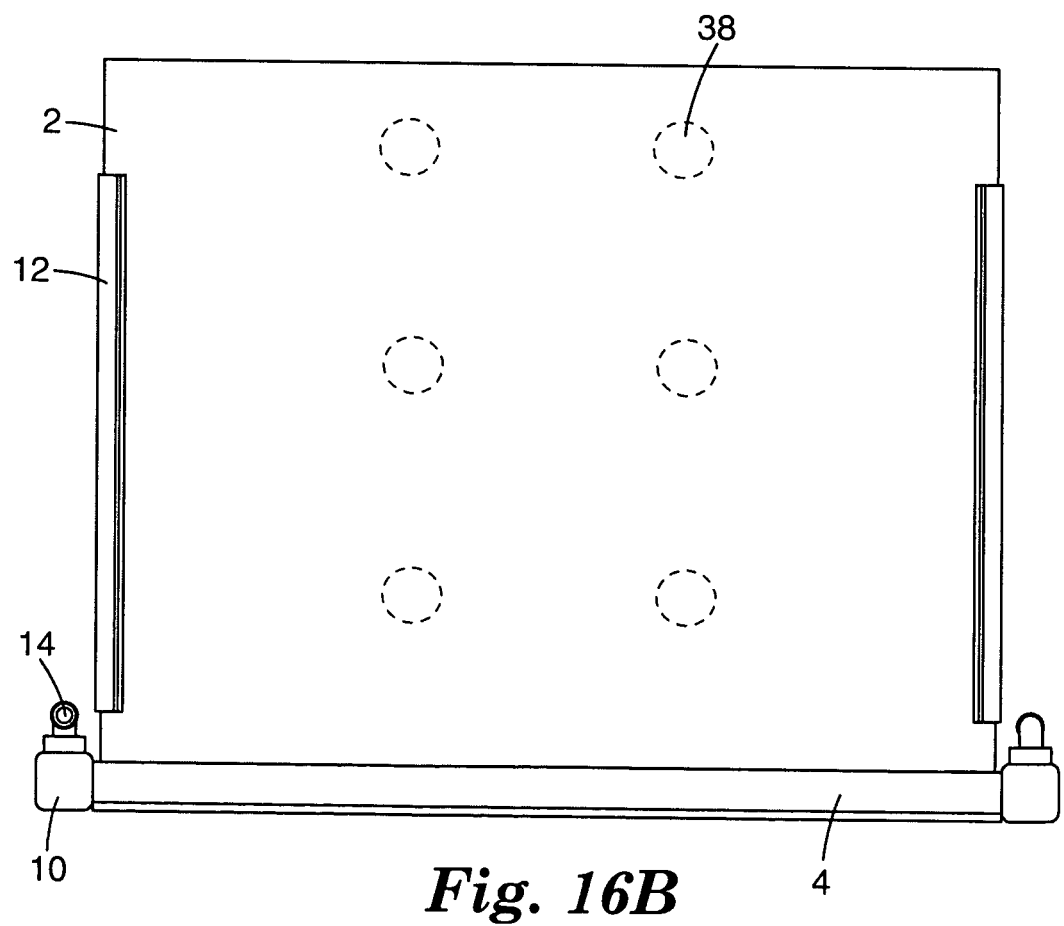

Alternatively, spacers can be utilized to hold the panels apart as shown in FIGS. 1-2 and in FIGS. 16A and 16B. Edge spacers 12 (see FIGS. 1 and 2), having protrusions of a fixed width extending partially into the spaces 8 between adjacent membrane elements 2, may be constructed of any suitable material and may be affixed to the edges of the membrane elements 2, for example, by bonding using a suitable adhesive. Alternatively, discrete spacers 38 may be disposed in the spaces 8 between adjacent membranes elements 2 as shown in FIGS. 16A and 16B. The discrete spacers 38 may have any shape and may be constructed of any suitable material, and have a fixed thickness for the purpose of maintaining an approximately uniform and constant distance between adjacent membrane elements 2. The discrete spacers 38 may be attached to at least one outer membrane surface 16 of the membrane elements 2, for example, using a suitable adhesive, during their fabrication and/or prior to their assembly into manifolded membrane modules. Subject to their purpose of maintaining an approximately uniform and constant spacing between adjacent membrane elements 2, it may be desirable for certain embodiments that the discrete spacers 38 be relatively small in size and used in minimal quantities, as their presence may render the portions of the selectively fluid permeable membrane surfaces to which they are bonded unusable for the purpose of fluid transfer.

Means for delivering a fluid into or from the chambers of a manifold, either directly into the primary manifold or via a secondary manifold attached to the primary manifold, are various and well known, and include the utilization of pressurized vessels, pumps, and/or fluid head pressure differentials.

The present invention has been described with reference to several embodiments. The foregoing description of specific embodiments has been provided to illustrate the invention, and is not intended to be limiting of the scope thereof. It will be apparent to those skilled in the art that many changes can be made to the described embodiments without departing from the spirit and scope of the invention.

All patents, applications, and publications mentioned above are incorporated by reference herein.

What is claimed is:

1. A membrane module for transferring a constituent to or from a fluid, said module comprising:

a) at least two flat sheet membrane elements, each element having an interior portion and an outer surface, wherein the interior portion comprises a plurality of flow channels; and b) at least one primary manifold that is permanently attached to the membrane elements, wherein said primary manifold is in fluid connection with the flow channels of the membrane elements, and c) a space between the membrane elements;

wherein said primary manifold comprises a first fluid flow channel that carries a first fluid to or from the interior portion of the membrane elements in direct fluid communication independent of flow from the interior portions to the outer surfaces of the membrane elements, and a second fluid flow channel that carries a second fluid to the space between the membrane elements, and wherein said second fluid flow channel is in direct fluid communication with the space between the membrane elements independent of flow between the interior portions to the outer surfaces of the membrane elements.

2. The membrane module of claim 1, wherein said second fluid comprises gas bubbles.

3. The membrane module of claim 2, wherein said bubbles range in size from about 0.5 mm to about 50 mm.

4. The membrane module of claim 3, wherein said bubbles range in size from about 1 mm to about 12 mm.

5. A membrane module for transferring a constituent to or from a fluid, said module comprising:

a) at least two flat sheet membrane elements, each element having an interior portion and an exterior portion;

b) at least one primary manifold that is permanently attached to the membrane elements, wherein said primary manifold is in fluid connection with the interior portion of the membrane elements; and c) a space between The membrane elements;

wherein the primary manifold comprises perforations for receiving gas bubbles dispensed from below the membrane module and delivering said bubbles to the space between the membrane elements.

6. The membrane module of claim 5, wherein the primary manifold further comprises V-shaped or angled channels for collecting fine bubbles dispensed from below the membrane module and combining to form larger bubbles for delivery to the space between the membrane elements.

7. The membrane module of claim 2, said module comprising a second primary manifold that is positioned at the opposite end of the membrane elements, wherein said second primary manifold is in fluid connection with the interior portion of the membrane elements.

8. The membrane module of claim 7, wherein the second primary manifold is adapted to disperse the gas bubbles that are delivered between the membrane elements, thereby preventing said gas bubbles from collecting within said module.

9. The membrane module of claim 8, wherein the second primary manifold is perforated to allow the gas bubbles to disperse.

10. The membrane modules of claim 8, wherein the second primary manifold is beveled or angled to allow the gas bubbles to disperse.

11. The membrane module of claim 1, wherein said module further comprises a spacer that separates adjacent flat sheet elements.

12. The membrane module of claim 1, wherein said module further comprises at least one secondary manifold in fluid connection with at least one primary manifold.

13. The membrane module of claim 1, wherein said module further comprises a secondary manifold in fluid connection with said fluid flow channel of said primary manifold.

14. The membrane module of claim 1, wherein tension is applied to said membrane elements to aid in maintaining the spacing of said membrane elements.

15. A membrane cassette comprising at least two of the membrane modules of claim 1.

16. The membrane cassette of claim 15 further comprising a frame surrounding or supporting said membrane modules.

* * * * *

UNITED STATES PATENT AND TRADEMARK OFFICE
CERTIFICATE OF CORRECTION

PATENT NO. : 7,279,215 B2  Page 1 of 1
APPLICATION NO. : 10/726900
DATED : October 9, 2007
INVENTOR(S) : Jonathan F. Hester It is certified that error appears in the above-identified patent and that said Letters Patent is hereby corrected as shown below:

On Page 2, in Column 2, under (Other Publications)
Line 35, delete "at.," and insert -- al., --, therefor.
Line 50, delete "Perfluoralkyl" and insert -- Perfluoroalkyl --, therefor.
Line 50, delete "Chorosilane" and insert -- Chlorosilane --, therefor.

Column 6
Line 39, after "7,140,495" insert -- , --.

Column 8
Line 35, delete "mercapten" and insert -- mercaptan --, therefor.

Column 12
Line 41, in Claim 5, delete "The" and insert -- the --, therefor.
Line 51, in Claim 7, delete "claim 2," and insert --claim 1, --, therefor.

Signed and Sealed this

Twenty-seventh Day of May, 2008

JON W. DUDAS
*Director of the United States Patent and Trademark Office*